United States Patent Office 3,452,072
Patented June 24, 1969

3,452,072
BICYCLIC ORGANOSILICON COMPOUNDS
WITH ALKYLENE LINKAGE
Christian R. Sporck, Burnt Hills, N.Y., assignor to General Electric Company, a corporation of New York
No Drawing. Filed Dec. 29, 1966, Ser. No. 605,552
Int. Cl. C07d *103/02;* C08g *31/32*
U.S. Cl. 260—448.2                                    5 Claims

ABSTRACT OF THE DISCLOSURE

A bicyclic organosilicon compound having both silalkylene and siloxane linkages and having the structure:

(1)
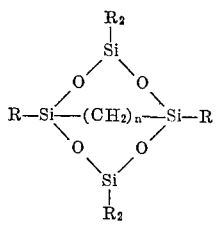

where R is a monovalent organic substituent and $n$ is from 2 to 6. The bicyclic compound polymerizes to a cross-linked material.

BACKGROUND OF THE INVENTION

In my copending application Ser. No. 605,551, filed Dec. 29, 1966 and assigned to the same assignee as the present invention, the monocyclic material having the formula:

(2)
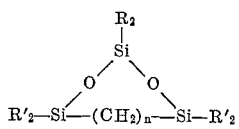

where R′ is a monovalent hydrocarbon radical free of aliphatic unsaturation and $n$ is from 2 to 6, is described and claimed. As pointed out in that application, the monocyclic material of Formula 2 is stable in the presence of acids and bases, even at high temperature. This was contrary to the ready polymerizability of very similar materials. Therefore, it was entirely unexpected to find that the material of Formula 1 was easily polymerizable. Thus, unlike the materials of Formula 2, the bicyclic organosilicon compound of the present invention is valuable in forming cross-linked polymers, either when the material is homopolymerized or when it is copolymerized with other materials and acts as the cross-linking agent for those materials.

SUMMARY OF THE INVENTION

This invention relates to bicyclic organosilicon materials having both siloxane and silalkylene linkages and having the formula:

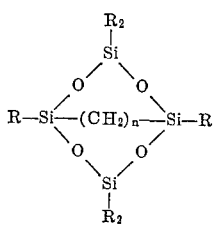

where R is a monovalent organic radical and $n$ is from 2 to 6.

The monovalent organic radicals represented by R can be selected from a wide variety of substituents and each R can be the same or can be different. For example, R can represent alkyl radicals, such as, methyl, ethyl, propyl, butyl, octyl, dodecyl, isopropyl, isobutyl, etc.; cycloalkyl radicals, such as, cyclohexyl, cyclopentyl, cycloheptyl, etc.; aryl radicals, such as phenyl, biphenylyl, naphthyl, benzoylphenyl, para-phenoxyphenyl, xylyl, etc.; aralkyl radicals, such as benzyl, phenethyl, etc.; alkenyl radicals, such as, vinyl, allyl, etc.; and substituted monovalent hydrocarbon radicals, including halogenated hydrocarbon radicals, such as chloromethyl, dibromophenyl, gamma, gamma, gamma-trifluoropropyl, etc.; and cyanoalkyl radicals, such as, cyanomethyl, alpha-cyanoethyl, beta-cyanoethyl, beta-cyanopropyl, gamma-cyanopropyl, delta-cyanobutyl, cyanophenyl, etc. The preferred substituents for R on the bicyclic organosilicon compound of Formula 1 are methyl and phenyl.

The compounds included within the definition of Formula 1, which are useful in forming cross-linked polymers, include those with 2 siloxane linkages on each of the joined cyclic rings and an alkylene bridge containing from 2 to 6 methylene units. Preferably, the compounds have 2 or 3 methylene units, e.g., ethylene or trimethylene bridges.

DETAILED DESCRIPTION OF THE INVENTION

The compounds of the present invention are formed by reacting a tetrachlorodisilaalkane compound of formula:

(3)   $Cl_2$—SiR—$(CH_2)_n$—$SiRCl_2$ with a diorganosilanediol of formula:

(4)   $R_2Si(OH)_2$ where R and $n$ are as previously defined. The reaction, which can be described by the following equation:

(5)
$Cl_2SiR$—$(CH_2)_n$—$SiRCl_2$ + $2R_2Si(OH)_2$ ⟶

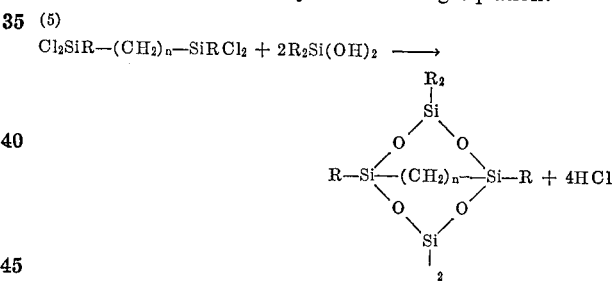 + 4HCl where R and $n$ are as previously defined, is preferably conducted in a solvent solution in the presence of an acid acceptor.

The two compounds are preferably reacted in the stoichiometric ratio of 2 parts of the diorganosilanediol for each part of the disilaalkane compound. However, a 10 percent excess, based on the stoichiometric ratio, of either compound can be employed. The reaction is carried out in a solvent with a total reactant concentration of from about 0.1 to 1.0 mole per liter. Preferably, each of the reactants is dissolved in a portion of the solvent, and the two solutions are added to a third portion of the solvent. However, neither the order of addition nor the manner of forming the solutions is critical, so long as the reactants dissolve quickly in the reaction mixture for easy reaction.

The solvents in which the materials are dissolved can be essentially any aliphatic or aromatic hydrocarbon solvent which is liquid under the conditions of reaction. When one of the reactants is a material such as diphenylsilanediol, a compound within generic Formula 4 which is difficulty soluble, it is often advantageous to dissolve the material in a mixture of the hydrocarbon solvent and acetonitrile, with the two solvents being mixed in equal volumes. This is to aid in dissolving the material. If desired, a cyclic nitrogen-containing compound, such as pyridine, can be substituted for the acetonitrile. The preferred hydrocarbon solvents are benzene, toluene, xylene, pentane, hexane, and heptane.

It is desirable to remove the hydrogen chloride which is generated in the reaction, as seen in Equation 5, as it is generated to prevent interference with the reaction. Therefore, an acid acceptor is mixed with the reaction solvent to absorb this hydrogen chloride. The acid acceptors which can be used are selected from any of the well-known weak bases used as acid acceptors in similar reactions. For example, the tertiary amines, such as pyridine, picoline, 1,4-diazabicyclo(2,2,2)octane, and the dialkyl anilines can be utilized. These acid acceptors absorb the generated hydrogen chloride in a molar ratio of 1:1. Thus, there must be at least one mole of acid acceptor used for each mole of hydrogen chloride produced. Preferably, the acid acceptor is present in an amount of from 25 to 100 percent in excess of the stoichiometric requirement, and can be present in an excess of several hundred percent.

The reaction can be accomplished at any temperature from about room temperature up to 50° C. Preferably, the reaction is run at room temperature for convenience, and because the reaction is accomplished so quickly, even at room temperature. However, when employing certain reactants, such as, diphenylsilanediol, the reaction should be carried out at a temperature closer to 50° C., since the diphenylsilanediol tends to precipitate from solution at temperatures lower than this and thus interfere with the course of the reaction.

The time of addition of the various reactants is immaterial, but preferably the solvent solutions of the reactants are added at equal rates to a third portion of the solvent containing the acid acceptor. The reaction mixture is then stirred for from about 15 minutes to 1 hour in order to assure completion of the reaction. The product is recovered by filtering the reaction mixture, particularly to remove the acid acceptor-hydrogen chloride salt, and the filtrate is washed and the solvent evaporated. The crude product remaining is fractionated and, preferably, is reprecipitated to assure a higher purity. Among the materials which can be used for reprecipitation are ethanol, acetonitrile, and methylethylketone.

The formation of the bicyclic organosilicon compounds of the present invention will now be described in greater detail. These examples should be considered as illustrations only, and not as limiting in any way the full scope of the invention as covered in the appended claims. All parts in the following examples are by weight.

Example 1

This example illustrates the preparation of a tetrachlorodisilaalkane compound of Formula 3 for use in producing a bicyclic compound of Formula 1. A reaction vessel was provided with an addition vessel, a condenser, a stirrer, and means for heating the reaction vessel. A quantity of 131 parts of methylvinyldichlorosilane was placed in the reaction vessel and was heated to 80° C. with stirring. When the desired temperature was attained, a catalytic quantity of a chloroplatinic acid catalyst was added followed by the slow addition of 115 parts of methyldichlorosilane, while maintaining the reaction mixture temperature at 80–90° C. The reaction mixture was stirred for a short time and was then subjected to a fractional distillation. The cut boiling at 213° C. was collected. The structure of the material as:

(6) 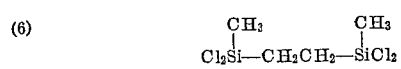

was substantiated by an infrared spectrum.

Example 2

The 2,2,5,5-tetrachloro-2,5-disilahexane produced in Example 1 was employed in this example to produce the corresponding bicyclic material. A reaction vessel was fitted with two addition vessels. Into the reaction vessel were placed 875 parts of dry benzene and 79 parts of dry pyridine.

A first solution was prepared containing 54 parts of diphenylsilanediol in 175 parts of benzene and 155 parts of dry acetonitrile and was placed in the first addition vessel. A second solution was prepared containing 32 parts of the 2,2,5,5-tetrachloro-2,5-disilahexane of Formula 6 in 350 parts of dry benzene and was placed in the second addition vessel. The solutions were added from the addition vessels to the reaction vessel at equal rates, with good stirring, over a period of about 50 minutes. Stirring was continued for about 20 minutes to assure completion of the reaction and the amine hydrochloride which formed was filtered off. The solvent was removed from the filtrate by evaporation and the residue was dissolved in 260 parts of toluene. The toluene solution was filtered to remove additional solids and the filtrate was washed with water until no traces of chloride ion could be detected by testing the wash water with silver nitrate.

The crude cyclic, in an amount of about 58.5 parts, was dissolved in 52.5 parts of hot acetonitrile and the solution was filtered. The solids were allowed to crystallize in the filtrate and 24.3 parts of solids having the formula:

(7) 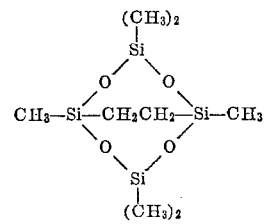

was recovered by filtration. This material corresponds to generic Formula 1 where each R is methyl and $n$ is 2. The bicyclic material was found to have a melting point of 132.5°–133.5° C. and its structure was substantiated by an infrared spectrum run in carbon disulfide. Chemical analysis showed the presence of 61.3% C., 5.5% H and 19.8% Si, as compared with theoretical values of 62.0% C., 5.5% H and 20.7% Si.

Example 3

A quantity of 2 parts of the bicyclic material of Formula 7 was heated to 150° C., with stirring. To the stirred material a quantity of 40 parts per million, based upon the weight of the bicyclic material, of potassium naphthalene was added and the material polymerized in 11 seconds. An attempt was made to dissolve the polymerized material in toluene, but the attempt was unsuccessful showing the cross-linked nature of the formed polymer. The structure of the polymerized material is believed to comprise recurring units of formula:

(8) 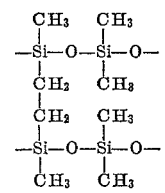

Thus, it can be seen that when the product of Formula 1 is heated in the presence of catalytic amounts of a polymerization catalyst, a polymer results having recurring units of the formula:

(9) 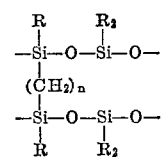

where R and $n$ are as previously defined. Among the catalysts which can be utilized for this polymerization are potassium hydroxide, sodium hydroxide, lithium hydroxide, cesium hydroxide, rubidium hydroxide, and potassium naphthalene. The amount needed is approximately equivalent to 40 parts per million of potassium hydroxide, based on the bicyclic compound. The bicyclic compound of Formula 1 can be polymerized either while molten, as shown in Example 3, or in a high boiling solvent solution.

The ladder-type structure which results, as shown in Formula 9, is particularly valuable for cross-linking other organopolysiloxanes. For example, these materials may be utilized as cross-linking agents for poly(dimethylsiloxanes). For example, from about 1 to 10 percent of the composition of the present invention can be copolymerized with from about 99 to 90 percent of such poly(dimethylsiloxanes). The result is an organopolysiloxane, less elastic than the straight chain material, but stronger.

The previous examples are illustrative only of the compounds of the present invention and should not be considered as limiting in any way the full scope of the invention as covered in the appended claims.

What I claim as new and desire to secure by Letters Patent of the United States is:

1. An organosilicon composition having the structure:

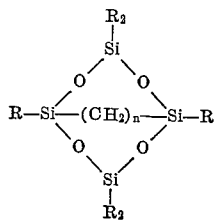

where R is a monovalent organic radical and $n$ is from 2 to 6.

2. The organosilicon composition of claim 1 wherein R is selected from the class consisting of methyl and phenyl.

3. The organosilicon composition of claim 1 wherein $n$ is from 2 to 3.

4. The organosilicon composition of claim 1 having the formula:

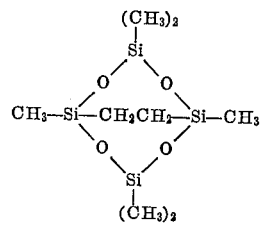

5. An organopolysiloxane composition polymerizable to a cross-linked state in the presence of catalytic amounts of a polymerization catalyst comprising from about 1 to 10 percent of the material of claim 1 and from about 99 to 90 percent of a linear organopolysiloxane.

References Cited

UNITED STATES PATENTS 2,582,799    1/1952    Sauer.
3,385,877    5/1968    Wu.

TOBIAS E. LEVOW, *Primary Examiner.*

P. F. SHAVER, *Assistant Examiner.*

U.S. Cl. X.R.

260—46.5